United States Patent
Schumacher

(10) Patent No.: US 6,735,765 B1
(45) Date of Patent: May 11, 2004

(54) SHARING DATA BETWEEN OPERATING SYSTEMS

(75) Inventor: Kurt G. Schumacher, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/455,842

(22) Filed: Dec. 7, 1999

(51) Int. Cl.$^7$ .............................. G06F 9/44
(52) U.S. Cl. ................ 717/164; 717/167; 717/100; 717/151; 711/115; 711/153; 711/147; 711/130; 715/522; 715/523
(58) Field of Search ................ 717/164, 167; 707/10, 522, 529, 9; 711/153, 173, 209, 111, 118, 100, 15, 147, 115, 112, 130; 715/522, 523

(56) References Cited

U.S. PATENT DOCUMENTS

| | | | | |
|---|---|---|---|---|
| 5,113,522 A | * | 5/1992 | Dinwiddie, Jr. et al. | 709/400 |
| 5,155,809 A | * | 10/1992 | Baker et al. | 709/227 |
| 5,339,427 A | * | 8/1994 | Elko et al. | 709/103 |
| 5,363,497 A | * | 11/1994 | Baker et al. | 711/153 |
| 5,432,929 A | * | 7/1995 | Escola et al. | 707/9 |
| 5,594,881 A | * | 1/1997 | Fecteau et al. | 711/209 |
| 5,649,204 A | * | 7/1997 | Pickett | 717/167 |
| 5,758,125 A | * | 5/1998 | Misinai et al. | 703/23 |
| 5,842,226 A | * | 11/1998 | Barton et al. | 711/203 |
| 5,920,893 A | * | 7/1999 | Nakayama et al. | 711/147 |
| 5,926,833 A | * | 7/1999 | Rasoulian et al. | 711/147 |
| 5,930,817 A | * | 7/1999 | Mizuno et al. | 711/114 |
| 5,991,542 A | * | 11/1999 | Han et al. | 717/167 |
| 6,119,118 A | * | 9/2000 | Kain, III et al. | 707/10 |
| 6,247,109 B1 | * | 6/2001 | Kleinsorge et al. | 712/13 |
| 6,260,068 B1 | * | 7/2001 | Zalewski et al. | 709/226 |
| 6,289,391 B1 | * | 9/2001 | Smith et al. | 719/312 |
| 6,301,666 B1 | * | 10/2001 | Rive | 713/200 |
| 6,314,501 B1 | * | 11/2001 | Gulick et al. | 711/153 |
| 6,332,180 B1 | * | 12/2001 | Kauffman et al. | 711/153 |
| 6,336,171 B1 | * | 1/2002 | Coskrey, IV | 711/152 |
| 6,336,175 B1 | * | 1/2002 | Shaath et al. | 711/163 |
| 6,353,837 B1 | * | 3/2002 | Blumenau | 707/205 |
| 6,381,682 B2 | * | 4/2002 | Noel et al. | 711/153 |
| 6,393,442 B1 | * | 5/2002 | Cromarty et al. | 715/523 |
| 6,438,642 B1 | * | 8/2002 | Shaath | 711/100 |
| 6,487,665 B1 | * | 11/2002 | Andrews et al. | 713/201 |
| 6,496,909 B1 | * | 12/2002 | Schimmel | 711/163 |
| 6,542,926 B2 | * | 4/2003 | Zalewski et al. | 709/213 |
| 6,598,129 B2 | * | 7/2003 | Kanda et al. | 711/147 |
| 6,633,916 B2 | * | 10/2003 | Kauffman | 709/229 |

FOREIGN PATENT DOCUMENTS

| | | |
|---|---|---|
| EP | 0 872 796 A1 | 10/1998 |
| WO | WO 99/12095 | 3/1999 |

OTHER PUBLICATIONS

Title: Sharing Data and Serviced in a Virtual Machine System, author: Bagley et al, ACM, 1975.*

(List continued on next page.)

Primary Examiner—Chameli Chaudhuri Das
(74) Attorney, Agent, or Firm—Wayne P. Bailey

(57) ABSTRACT

The present invention discloses a technique for sharing data between at least two operating systems. In accordance with the present invention, a volume is provided in a data storage device. The provided volume is a portion of memory within the data storage device. The provided volume is accessible by a source operating system residing on a source computer and a target operating system residing on a target computer. Data is generated within the provided volume using the source operating system. The generated data is in a format that is readable by the target operating system.

25 Claims, 5 Drawing Sheets

OTHER PUBLICATIONS

Title: a programmable interface language for heterogeneous distributed systems, Author: Joseph R. Falcone ACM, Oct. 1987.*

Title: Sharing and Protection in a single address space operating system, author: Chase et al, ACM, 1994.*

TITLE: Storage Systems for National Information Assets, author: Coyne et al, IEEE, 1992.*

TITLE: High Performance File System for Supercomputing Evironment, author: Nishino et al, ACM, 1989.*

TITLE: A System Simulating Shared Memory in Heterogeneous Distributed Memory Networks with Specializations for Robotics Applications, author: Jones et al, IEEE, 1992.*

* cited by examiner

SHARING DATA BETWEEN OPERATING SYSTEMS

TECHNICAL FIELD OF THE INVENTION

This invention generally relates to formatting computer-stored database information in memory. More particularly, the present invention relates to a new and improved method for extracting database information from one location in memory and placing the extracted information into a computer readable file in another location in memory that can be accessed by a computer system that uses a different operating system to thereby enable data sharing.

BACKGROUND OF THE INVENTION

Database computer files contain a significant amount of information that may be beneficial to many different computer users over a computer network. However, many of the computer users wanting access to a particular database associated with a host or source computer may not use the same type of computer as the source computer. Additionally, the different computers may operate using a different operating system than that of the source computer. Unfortunately, data sharing between computers that use different operating systems is generally slow and cumbersome.

Each computer that uses a different operating system employs a different method of storing and retrieving data in memory. The different formats are typically designed for a particular computer system and its associated operated system, wherein different operating systems typically store data in different formats. Some operating systems store data in records as fixed length data and at a fixed position within a file or within a memory storage device. Other operating systems may use delimiter to distinguish between records of variable length and location within the memory storage device.

The use of these multiple formats creates a substantial obstacle for computer users who wish to share data between differing operating systems. In essence, data stored in a particular format for a particular computer system must be converted to the format of the computer system that wishes to access an existing database created on a computer system running a different operating system. That is, the database information must be converted to the target computer system's native format such that the target computer system recognizes the database information as if it were created on a computer system running the same operating system as the target computer system.

As an example, a database generated on an International Business Machines ("IBM") mainframe using a DB2 OS/390 system is stored in a specific binary format associated particularly with the DB2 OS/390 system. Other computer users may want to access the database information using a computer system running an "Open System" type of operating system. Open Systems are compatible with multiple hardware and software architectures and communications systems components. The purpose of an Open System is to provide portability of software across standard system platforms, interoperability between applications, connectivity between systems and flexibility in the management of an information systems resources. Typical Open Systems type operating systems include UNIX and Windows NT made and manufactured by Hewlett Packard and Microsoft, respectively.

The UNIX Open System may run on a work station connected to a Sun or HP server and may incorporate an Oracle database connected to the workstation. The Oracle database is stored within memory of a memory storage device connected to the workstation. However, the Oracle database does not contain the database information generated by the DB2 OS/390 system.

In order to share the database information that is generated on the OS/390 system, the database is subjected to a database extraction technique performed by the source computer system. The database extraction technique converts the DB2 database from its DB2 binary format into a plain text format. The database extraction technique stores the plain text format in a data file that resides in a storage device connected to the OS/390 system. This data file is frequently referred to as a flat file. As per this technique, each data line of the flat file contains one database record. The flat file is then transferred from the storage device connected to the OS/390 system to a storage device connected to the UNIX system computer. The plain text database information from the flat file is downloaded into the Oracle database associated with the UNIX system computer.

Generally, the task of transferring the flat file from the storage device of one operating system (i.e., the source computer) to the storage device of another computer using a different operating system (i.e., the target computer) is quite time consuming. For example, one technique of transferring a flat file involves transferring the file over a network conductor using a specific protocol such as file transfer protocol ("FTP") which is a standard Internet protocol used for sending and receiving files. However, transferring large amounts of data over a network conductor significantly impacts the traffic on the network, consumes substantial bandwidth and slows down the system. More particularly, transferring the flat file over the network may take an unsatisfactory amount of time.

Another technique for transferring the flat file involves copying the flat file from the data storage device connected to the OS/390 system on to a portable data storage device that can be detached from the OS/390 system, e.g., a disk or tape. Once the flat file is copied on to the portable data storage device, the device is physically transported, carried or shipped, to the site of the target computer system where it is connected to the target computer and the file is downloaded to the storage device of the target computer. This copying and physical transporting can be quite time consuming and cumbersome. Once the flat file has been transported and downloaded to the storage device of the target computer, the file is then converted into a database recognizable by the Open System database application.

Another drawback associated with physically transferring the flat file from the storage device of one computer system to the storage device of another computer system is that two copies of the database exist. When two copies of the database exist, essentially twice the necessary memory is consumed which is an inefficient allocation of resources. Ideally the multiple computers using different operating systems can share the same file without transferring the flat file.

It is with respect to these issues that the present invention has been made.

SUMMARY OF THE INVENTION

The present invention relates to a method of extracting the database information and creating a flat file that is accessible and readable directly by a computer system that runs on an operating system that is different from the operating system used to create the database. One aspect of the present invention relates to a method of formatting the flat file in such a manner that no physical transportation of the flat file is necessary. Another aspect to the present invention relates to an apparatus capable of connecting to both a computer system running an Open System operating system and a DB2 OS/390 computer system wherein each computer system is capable of reading and accessing the same flat file.

In accordance with these aspects the present invention relates to a method of sharing data between at least two operating systems. The method comprises the steps of providing a volume in a data storage device, wherein the provided volume is a portion of memory within a data storage device, and the provided volume is accessible by a source operating system residing on a source computer and a target operating system residing on a target computer; and generating data within the provided volume using the source operating system, wherein the generated data is in a format that is readable by the target operating system. Before the step of generating data, the target operating system is detached from the provided volume so that the provided volume cannot be accessed by the target operating system. Following the generation of the data, the target operating system is attached to the provided volume so that both the provided volume and the generated data can be accessed by the target operating system.

In accordance with other preferred aspects, the present invention relates to an apparatus for sharing data between at least two operating systems. The apparatus comprises a data storage device connected to a source computer and a target computer and a volume, wherein the volume is a portion of memory within the data storage device. The volume is accessible by a source operating system residing on the source computer and a target operating system residing on the target computer. Additionally, the apparatus comprises one or more computer program routines, performed by the source computer, for generating data within the volume using the source operating system, wherein the generated data is in a format that is readable by the target operating system.

These and various other features as well as advantages which characterize the present invention will be apparent from a reading of the following detailed description and a review of the associated drawings.

DETAILED DESCRIPTION OF THE INVENTION

Embodiments of the invention described herein are generally implemented as logical operations in an intelligent controller in a storage control system. The logical operations of the present invention are implemented (1) as a sequence of operations directed by program instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

Figure 1:
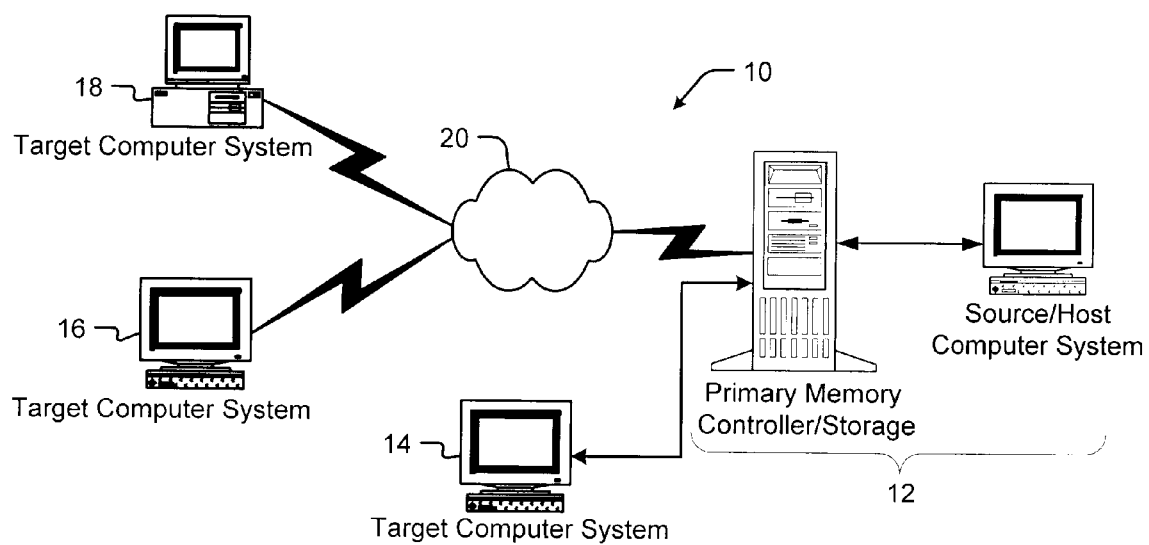
FIG. 1 is a pictorial representation of a computer network including a server computer system which stores a database of information and which performs the extraction technique of the present invention.

An exemplary network or distributed computer system 10 incorporating a server computer system 12 that performs the extraction technique of the present invention is shown in FIG. 1. The distributed computer system 10 also comprises other client or target computer systems 14, 16 and 18 that are connected to the server computer system 12. The client computers 14, 16 and 18 are referred to as target computers since these computers access database information generated by and located in memory associated with the server computer 12.

The computer 14 is connected directly to the server computer 12 and the computers 16 and 18 are connected to the server computer 12 by means of a network connection such as through the Internet 20. The computers 14 and 16 operate using an operating system different than the operating system used by the server computer 12. The operating system used by computer 18 may or may not be different than the operating system used on server computer 12. The computers 14, 16 and 18 may access database information present on server computer 12. Moreover, the computers 14, 16 and 18 may access database information on 12 without transferring the database file to storage devices present on computers 14, 16 and 18.

Figure 2:
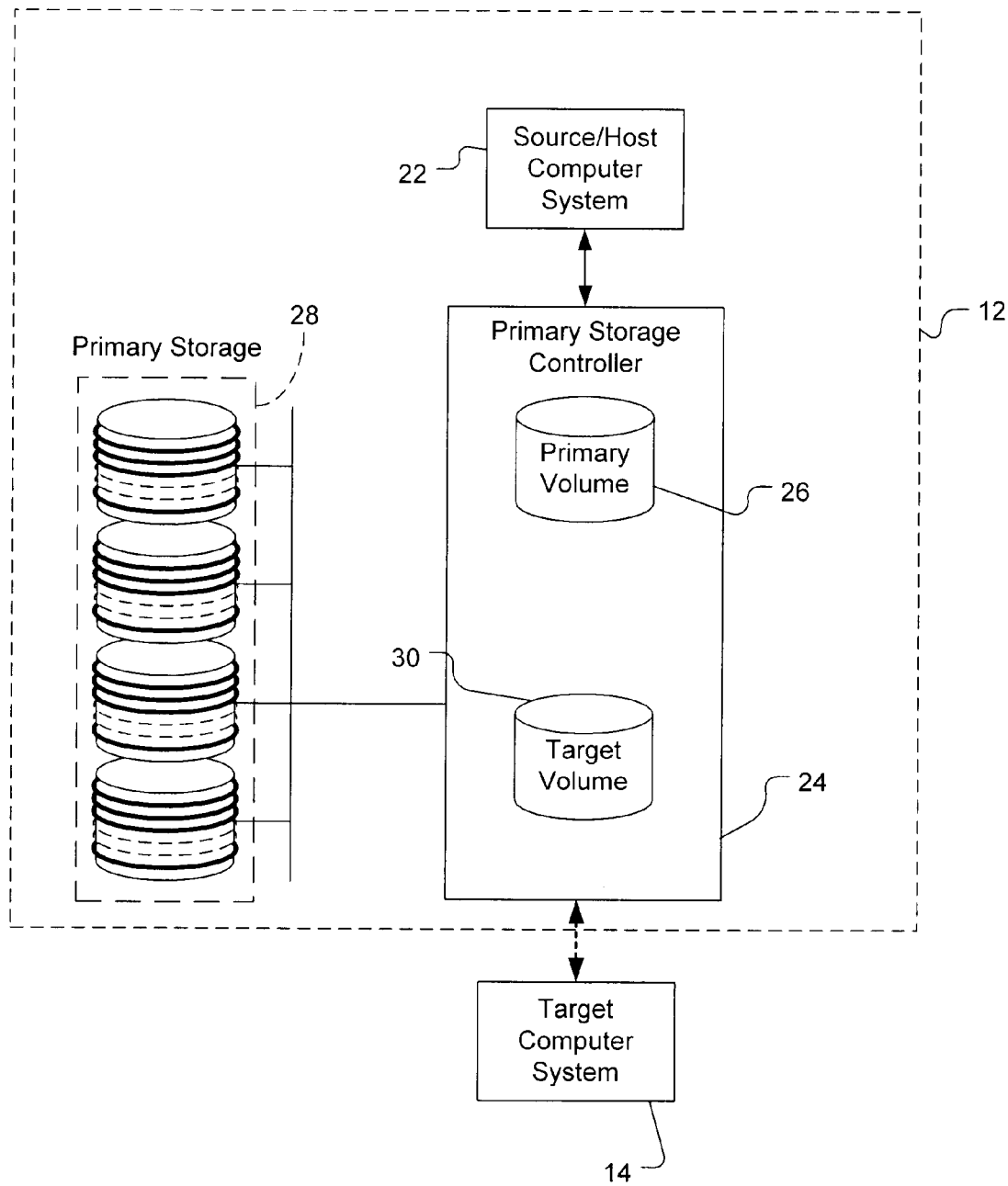
FIG. 2 is a block diagram of the server computer system shown in FIG. 1.

The server computer 12 (FIG. 1) is a system of resources for implementing an embodiment of the invention as shown in FIG. 2. The system 12 incorporates a host computer 22 having at least one central processing unit (CPU, not shown), a memory system (not shown) and input and output devices (not shown). As part of server computer system 12, the application host system 22 performs a significant amount of processing for at least one client computer 14 (e.g., a personal computer or workstation) coupled to it. Alternatively, the application host system 22 may include a personal computer system, a mainframe computer system, or a minicomputer system. The application host system 22 executes an application that must access large amounts of data controlled by a primary storage controller 24. The application host system 22 periodically reads from and writes to the primary storage controller 24 in accordance with program instructions provided by the application and associated system drivers. The CPU or microprocessor in the application host system 22 executes the program instructions that are typically stored in the memory system accessible by the application host system 22. The memory system can include, without limitation, host memory or a local storage disk.

The primary storage controller 24 comprises cache memory for recording virtual disk volumes, such as a primary volume 26, that are logically mapped to local data stored on physical storage disks in a disk array, such as disk array 28. The primary volume 26 presents to the application host system 22 a virtual disk from which the application host system 22 can read data (and to which it can write data) as though it were accessing a physical disk drive. The primary volume 26 provides a logical interface to the data stored in the disk array 28, regardless of where the data is physically stored within a disk array. For example, it is common to allocate a storage track of the primary volume across multiple disks in the disk array 28, using a technique called "striping." As a result, the application host system 22 accesses the primary volume 26 as a continuous disk volume, while the data is physically distributed throughout the disk array 28.

The storage controller 24 supports multiple volumes (i.e., multiple virtual disks) associated with the disk array 28. The primary storage controller 24 includes at least two virtual volumes, a primary volume 26 and a secondary target volume 30, wherein each volume 26 and 30 maps data stored in the disk array 28. In an embodiment of the present invention, the host system 22 configures the primary storage controller 24 to perform shared data extraction of database information found in the primary volume 26 to the target volume 30. That is, the host computer 22 performs a data extraction technique that generates the target volume 30 and places database information found in the primary volume 26 into the target volume 30. In creating this target volume 30, the host computer 22 creates a file system within the volume such that it appears to have been formatted in the native format of the target computer system 14.

The target computer system 14 connects to the primary storage controller 24 and accesses the target volume 30. Since the target volume 30 appears to have been formatted in the native format of the target computer system 14, the target computer system 14 can access the file within the volume 30 directly without the need to transfer the files to its own memory system.

Figure 3:
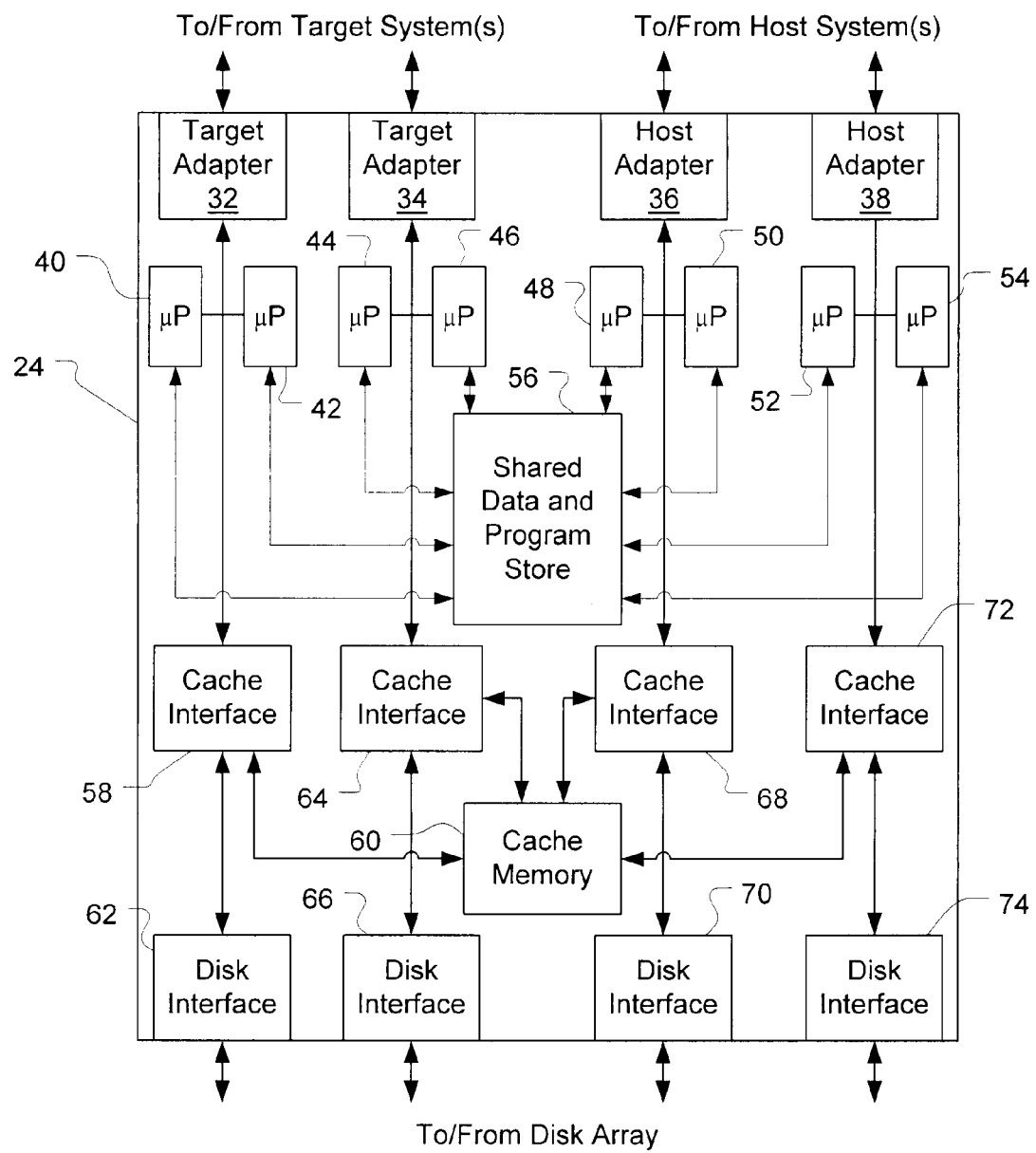
FIG. 3 is a block diagram of a primary storage controller incorporated in the server computer system shown in FIGS. 1 and 2 used to store a flat file.

A block diagram of the storage controller 24 is shown in FIG. 3. An example of a primary storage controller is the Iceberg product marketed by Storage Technology Corporation. The storage controller 24, includes adapters 32, 34, 36 and 38. The host adapters 36 and 38 are coupled to the host system 22, and the target adapters 32 and 34 are coupled to a target computer, such as client computer 14. Microprocessors 40, 42, 44, 48, 48, 50, 52, and 54 process data communicated through the adapters 32, 34, 36, and 38 in accordance with program instructions stored in a shared data and program store 56. In an alternative embodiment, each microprocessor 40, 42, 44, 46, 48, 50, 52, and 54 is coupled to an individual memory device including program instructions and data. Preferably, the program instructions are downloaded to the shared data and program store 56 by a support processor (not shown). The shared data and program store 56 (alternatively referred to as shared memory) stores the logical representation (e.g., pointers) of at least one virtual disk volume controlled by the controller 24. The data communicated through target adapter 32 is also communicated through a cache interface 58 to cache memory 60 or to a disk interface 62. The disk interface 62 communicates data to and from the cache interface 58 to a disk array (not shown), such as disk array 28 shown in FIG. 2. In a preferred embodiment of the present Invention, the disk interface 62 is a communications port, such as an ESCON port, to a fiberoptic cable.

A second set of components includes the target adapter 34, the microprocessors 44 and 46, a cache interface 64 and a disk interface 66. Another set of components includes the host adapter 36, the microprocessors 48 and 50, a cache interface 68, and a disk interface 70. Yet another set of components includes the host adapter 38, microprocessors 52 and 54, a cache interface 72 and a disk interface 74. It is to be understood that data from one host or target adapter 32, 34, 36 or 38 can be communicated through any disk interface 62, 66, 70 or 74 in the storage controller 24. Likewise, it is to be understood that data from a disk interface 62, 66, 70 or 74 can be communicated through any host or target adapter 32, 34, 36 or 38 in the storage controller 24. Furthermore, a virtual disk volume defined in the cache memory 60 can be accessed through any host or target adapter 32, 34, 36 or 38 in the storage controller 24 and can logically map to any disk in any disk array coupled through the disk interfaces 62, 66, 70 and 74. It is through this flexibility that the storage controller 24 and associated applications can provide a means of managing large amounts of storage. In effect, the complicated distribution of physical storage is abstracted and presented to either the host or the target as a virtual disk volume. In this manner, the configuration of physical storage is not as important to the host or the target computers because the virtual volume provides a consistent interface for the respective computer applications accessing a particular volume.

Figure 4:
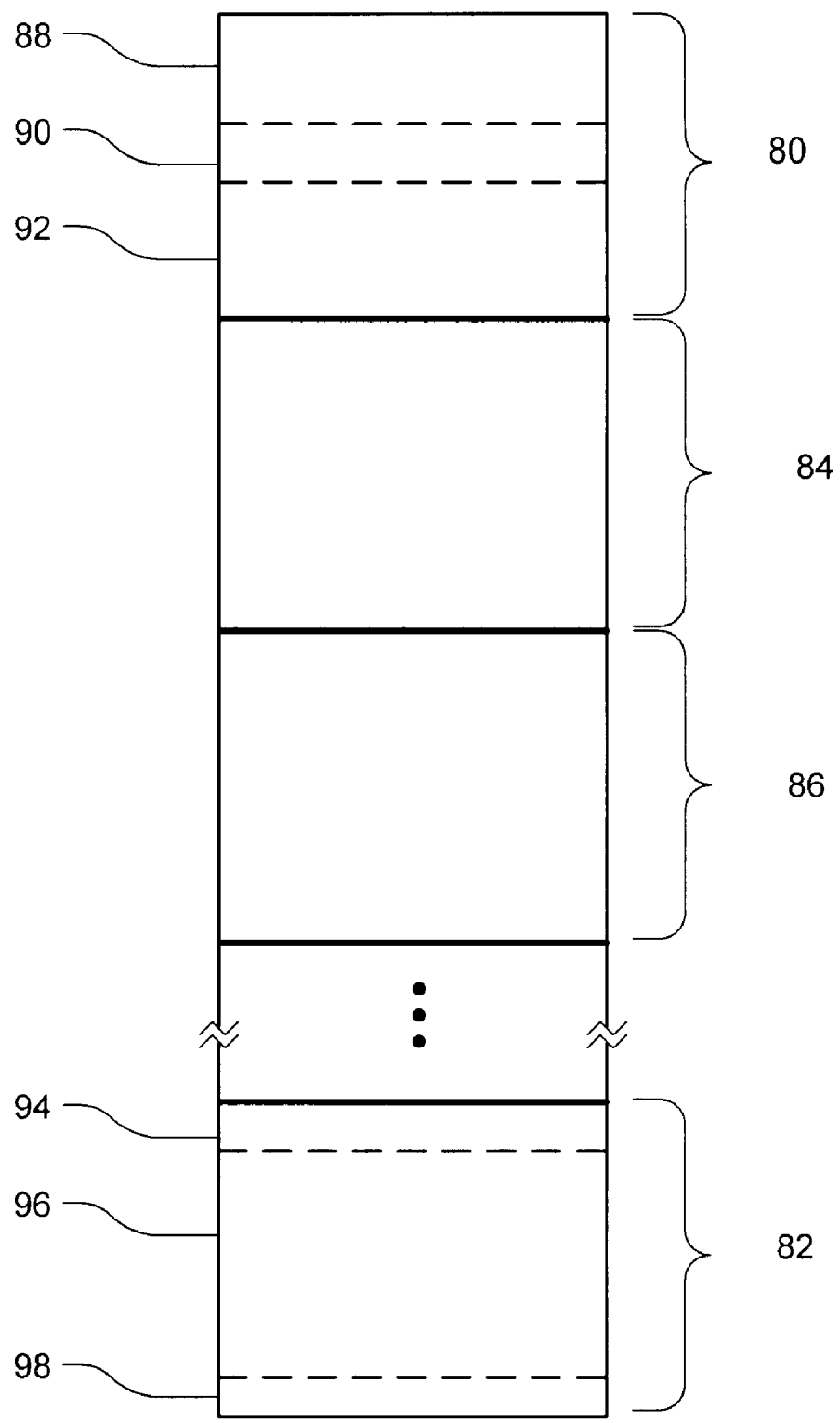
FIG. 4 is a block diagram of virtual volumes created by the primary storage controller following the shared data extraction technique of the present invention.

A block diagram representing the storage of the data storage device 28 (FIG. 2) is shown in FIG. 4. The available storage of the data storage device 28 is separated into separate portions or volumes. Exemplary virtual volumes of the primary storage controller 24 are represented in FIG. 4. Virtual volume 80 represents the primary volume 26 and virtual volume 82 represents the target volume 30. Virtual volumes 84 and 86 represent intermediate volumes. Although volumes 84 and 86 are shown in FIG. 4, it is to be understood that these volumes are not considered necessary to the present invention and are only included to illustrate the capability of the primary storage controller 24 to support multiple volumes. Likewise, many more volumes may be supported than the four volumes 80, 82, 84 and 86 represented in FIG. 4.

The primary volume 80 comprises the database information 88 that is to be shared. The database information 88 in volume 80 is formatted to be accessible by the host computer system 22. The volume 80 has at least two components, the database information in a specific format 88 and format information 90 which is typically embedded in the volume 80. Additionally, the volume 80 may contain other information or files 92.

During the extraction technique of a preferred embodiment, the target volume 82 is created. The volume 82 comprises format information 94, a sequential data file 96, and amended control information 98. The format information 94 is data in a format readable by the host computer system 22. However, the format information 94 also defines a volume format that enables the remainder of the volume 82 to be readable by the target computer 14. The target volume is created in a format readable by the target operating system. This may be any one of a number of UNIX or Windows file system formats. Preferably, a software application, as part of controller performs this operation. The program understands the internal format of both the source and target file systems. Since the system preferably is capable of multiple formats, the user must indicate the desired target format to the program. This may be done in any of a number of standard methods, such as through the use of control cards or by having the user alter command parameters. These methods of communicating program controls are well understood to one skilled in the art.

The sequential data file 96 is the flat file of database information. This file is stored in the volume in such a manner that the target computer 14 can read the file. The flat file is written to the target file system in a file format that is readable by the target system. This may require some translation of the data in the file; for example conversion of end-of-record indicators, or translation of character sets such as EBCDIC to ASCII. These translations may be automatic, or they may be controlled by the user with control cards or command parameters. The internal structure of the file system may also require that file system control information be written to the flat file along with the extracted database information.

The amended control information 98 essentially provides the format information that the file is in the volume and where it begins and ends. When the target computer system 14 accesses volume 82, it appears as if the volume 82 was created by a computer that uses the same operating system as the target computer 14. Thus, the target computer 14 essentially sees a populated file system similar to its native file systems. However when the host computer 22 accesses the volume 82, the volume 82 appears to have three files, one related to format information 94, one sequential file 96 and the amended control information 98.

In a preferred embodiment the volume 82 is created by a host computer system 22 operating the DB2 OS/390 operating system in Count Key Data format ("CKD"). However, the volume can be read by a target computer system 14 using an open operating system such as UNIX, Windows NT, etc. When read by the open system computer, the volume 82 appears to be in Small Computer System Interface format ("SCSI"), which is the target computer's native format. For example, the volume is formatted to be read by a UNIX operating system target computer in such a manner that the target computer reads the volume as if the volume was formatted by a computer that operates using the UNIX operating system.

The size of the flat file 96 does not exceed the size of the volume 82, which may be a predefined amount of memory within the data storage device 28 (FIG. 2). Therefore, large amounts of data may require the creation of multiple file systems, wherein each file system contains a single file. The UNIX Open System operating system can begin accessing the data when the first file system is created. The UNIX Open System is not required to wait until all the file systems are created.

In an alternative embodiment of the extraction technique of the present invention, the flat file 96 can span multiple volumes (not shown) with each file system containing a single file. In yet another embodiment of the extraction technique creates a flat file that spans multiple volumes, with each file system containing multiple files.

Figure 5:
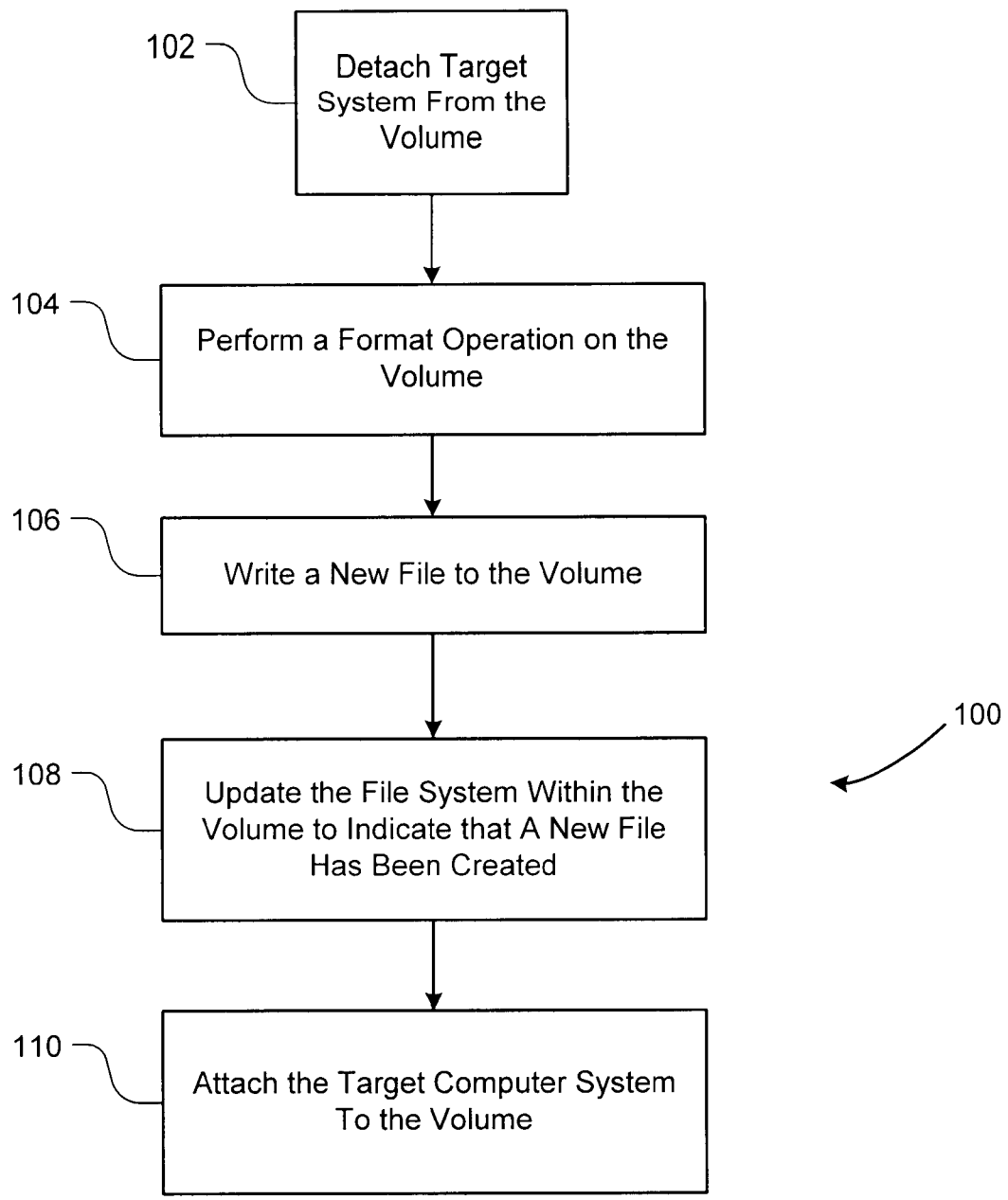
FIG. 5 is a flow chart illustrating the logical functions of the shared data extraction technique in accordance with an embodiment of the present invention.

The functional operations of the extraction process 100 are depicted in FIG. 5. Before the target volume is generated using the extraction process 100, detach operation 102 detaches the target computer 14 from the volume 82. Detach operation 102 is performed in order to disable the target computer 14 from being able to access the volume 82 while format and other information is being written to the volume 82. Denying access in this manner prevents conflicts between the two computers, i.e., the host 22 and the target 14, from attempting to access the information at the same time. Preferably a storage administrator detaches the target computer 14 from the volume 82 by physically detaching the computer 14 from the primary storage controller 24. As a result of the detachment, the target computer 14 can not access the volume 82 ensuring that the target computer 14 does not inadvertently interfere with the host system's changes to the volume 82.

The host computer 22, using its own operating system, then executes a routine, preferably in software, that performs format operation 104. Format operation 104 is similar to a formatting operation performed on a floppy disk wherein information is written to the storage media in order to present a readable file system to the computer. The host operating system erases any and all bookkeeping information from the volume 82, tests the volume 82 to make sure it is reliable, marks any bad sections, and creates internal address table that can be used later to locate information. The formatting operation 104 also involves creating at least one empty file system in a sequential data set within the volume 82. Creating the empty file system is similar to creating a directory on a desktop personal computer.

Once the format operation 104 is complete, write module 106 writes a new file to the file system within the volume 82. This step involves extracting the data from the database volume 80 and creating a flat file. The flat file contains plain text database information in a format that is readable by the target computer system 14. Write module 106 is a software routine executed by the host computer system 22.

To indicate that a new file has been created, the host operating system next performs update operation 108 which updates the file system within the volume 82. Update operation 108 provides the control information related to the location of the file 96.

Attach operation 110 follows update operation 108 and essentially enables the target computer 14 to access the volume. Preferably, the storage administrator physically attaches the target computer to the volume to facilitate the connection.

In the preferred embodiment, the host computer 22, using the OS/390 operating system creates the volume 82. The computer system 22 executes a software routine that performs format operation 104 and writes an empty file system in what is known as the sequential data set of the volume 82. The computer 22 then executes another software module to extract and write the flat file into the sequential data set. Additionally the computer 22 calls or executes another separate routine that specifically provides information or adds information to the file system that is read by the target computer 14 to define the file system as having a flat file. More specifically, the first routine provides control information related to the file system for the target computer and the second routine provides information related to the file within the file system. Importantly the information used by each routine is specific to the operating system of the target computer 14. Therefore each routine must be designed using the specific file system organization rules and procedures outlined by the target computer 14 operating system. The present invention exploits the capability of the primary storage controller 24 to create a volume 82, using the OS/390 operating system running on a mainframe computer and to write one or more files to that portion of an Iceberg data storage device which can then be accessed by an Open System computer. When the files are accessed by the open system running on a workstation, these same OS/390 files appear to be stored and organized as a native file system. Unlike conventional data extract systems, the present invention is capable of using a source operating system, such as an OS/390 operating system, to create a file that appears to have been created using a target operating system, such an a UNIX Opens Systems operating system.

Therefore, the primary storage controller 24 of the server computer system 12 contains a volume 82 that is readable by both a DB2 OS/390 computer and an Open Systems computer system. During the extraction process 100 the data from the database is extracted and placed into the volume 82 that is readable by the Open Systems computer 14. Placing this data into this particular volume 82 avoids the need to physically transfer the extracted file from the storage device 28 to a storage device that is readable by the open systems computer system 14 which saves time and effort.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of sharing data between at least two operating systems, the method comprising the steps of:
   providing a virtual volume in a data storage device, wherein the provided virtual volume is accessible by a source operating system and a target operating system;
   formatting the provided virtual volume by the source operating system in a format compatible with the target operating system so that the source operating system can generate data within the provided virtual volume for direct access by the target operating system; and
   generating data within the provided virtual volume using the source operating system, wherein the generated data is stored by the source operating system in a format that is directly readable by the target operating system.

2. The method of claim 1, further comprising the steps of:
   before the step of generating data, detaching the target operating system from the provided virtual volume so that the provided virtual volume cannot be accessed by the target operating system; and
   after the step of generating data, attaching the target operating system to the provided virtual volume so that the both the provided virtual volume and the generated data can be accessed by the target operating system.

3. The method of claim 1, wherein the provided virtual volume comprises at least one file system and the generated data comprises at least one file.

4. The method of claim 3, further comprising the step of, for each file, updating the file system within the provided virtual volume to indicate that a new file exist.

5. The method of claim 1, wherein the step of providing a virtual volume comprises providing a plurality of virtual volumes in a data storage device, and each provided virtual volume is accessible by the source operating system and the target operating system.

6. The method of claim 1, wherein the source operating system resides on a source computer and the target operating system resides on a target computer.

7. The method of claim 1, further comprising the step of generating format information for the virtual volume, wherein the format information is readable by the source operating system.

8. The method of claim 7, wherein the format information defines a volume format that enables at least a portion of the virtual volume to be read by the target operating system.

9. An apparatus for sharing data between at least two operating systems, comprising:
   a data storage device connected to a source operating system and a target operating system;
   a virtual volume, wherein the virtual volume is accessible by the source operating system and the target operating system; and
   one or more computer programs for formatting the virtual volume by the source operating system in a format compatible with the target operating system so that the source operating system can generate data within the virtual volume for direct access by the target operating system and for generating data within the virtual volume using the source operating system, wherein the generated data is stored by the source operating system in a format that is directly readable by the target operating system.

10. The apparatus of claim 9 wherein the source operating system resides on a source computer and wherein the target operating system resides on a target computer, and wherein the computer program for generating data is executed on the source computer.

11. The apparatus of claim 10, further comprising one or more computer programs, performed by the source computer, for, before generating data within the virtual volume, detaching the target operating system from the virtual volume so that the virtual volume cannot be accessed by the target operating system, and after generating data, attaching the target operating system to the virtual volume so that the both the virtual volume and the generated data can be accessed by the target operating system.

12. The apparatus of claim 10, wherein the virtual volume comprises at least one file system and the generated data comprises at least one file.

13. The apparatus of claim 12, further comprising one or more computer programs, performed by the source computer, for updating the file system within the virtual volume to indicate that a new file exist.

14. The apparatus of claim 10, wherein the virtual volume is comprised of a plurality of virtual volumes in a data storage device, and each virtual volume is accessible by a source operating system residing on a source computer and a target operating system residing on a target computer.

15. The apparatus of claim 9, wherein the virtual volume comprises format information and a data file, and wherein the format information is readable by the source operating system.

16. The apparatus of claim 15, wherein the format information defines a volume format that enables at least a portion of the virtual volume to be read by the target operating system.

17. An article of manufacture comprising a computer program carrier readable by a source computer and embodying one or more instructions executable by the source computer to perform method steps for sharing data between at least two operating systems, the method comprising the steps of:
   providing a virtual volume in a data storage device, wherein the provided virtual volume is accessible by a source operating system and a target operating system;
   formatting the provided virtual volume by the source operating system in a format compatible with the target operating system so that the source operating system can generate data within the provided virtual volume for direct access by the target operating system; and
   generating data within the provided virtual volume using the source operating system, wherein the generated data is stored by the source operating system in a format that is directly readable by the target operating system.

18. The article of manufacture of claim 17, further comprising the steps of:
   before the step of generating data, detaching the target operating system from the provided virtual volume so that the provided virtual volume cannot be accessed by the target operating system; and after the step of generating data, attaching the target operating system to the provided virtual volume so that the both the provided virtual volume and the generated data can be accessed by the target operating system.

19. The article of manufacture of claim 17, wherein the provided virtual volume comprises at least one file system and the generated data comprises at least one file.

20. The article of manufacture of claim 19, further comprising the step of, for each file, updating the file system within the provided virtual volume to indicate that a new file exist.

21. The article of manufacture of claim 17, wherein the source operating system resides on a source computer and the target operating system resides on a target computer.

22. The article of manufacture of claim 17, wherein the step of providing a virtual volume comprises providing a plurality of virtual volumes in a data storage device, and each provided virtual volume is accessible by a source operating system residing on a source computer and a target operating system residing on a target computer.

23. The article of manufacture of claim 17, further comprising the step of generating format information for the virtual volume, wherein the format information is readable by the source operating system.

24. The article of manufacture of claim 23, wherein the format information defines a volume format that enables at least a portion of the virtual volume to be read by the target operating system.

25. In combination:
 a first data processing system;
 a second data processing system;
 a disk array; and
 a storage controller coupled to the first and second data processing systems and the disk array, wherein the storage controller comprises a first virtual volume and a second virtual volume, wherein each of the first and second virtual volumes maps data stored in the disk array, wherein the first data processing system configures the storage controller such that the storage controller (i) formats the second virtual volume in a second format compatible with the second data processing system so that the first data processing system can generate data within the second virtual volume for direct access by the second data processing system and (ii) extracts data from the first virtual volume which is in a first format compatible with the first data processing system and copies the extracted data to the second virtual volume in a the second format which is compatible with the second data processing system, wherein the first and second formats are different.

* * * * *